United States Patent Office 3,241,019
Patented Mar. 15, 1966

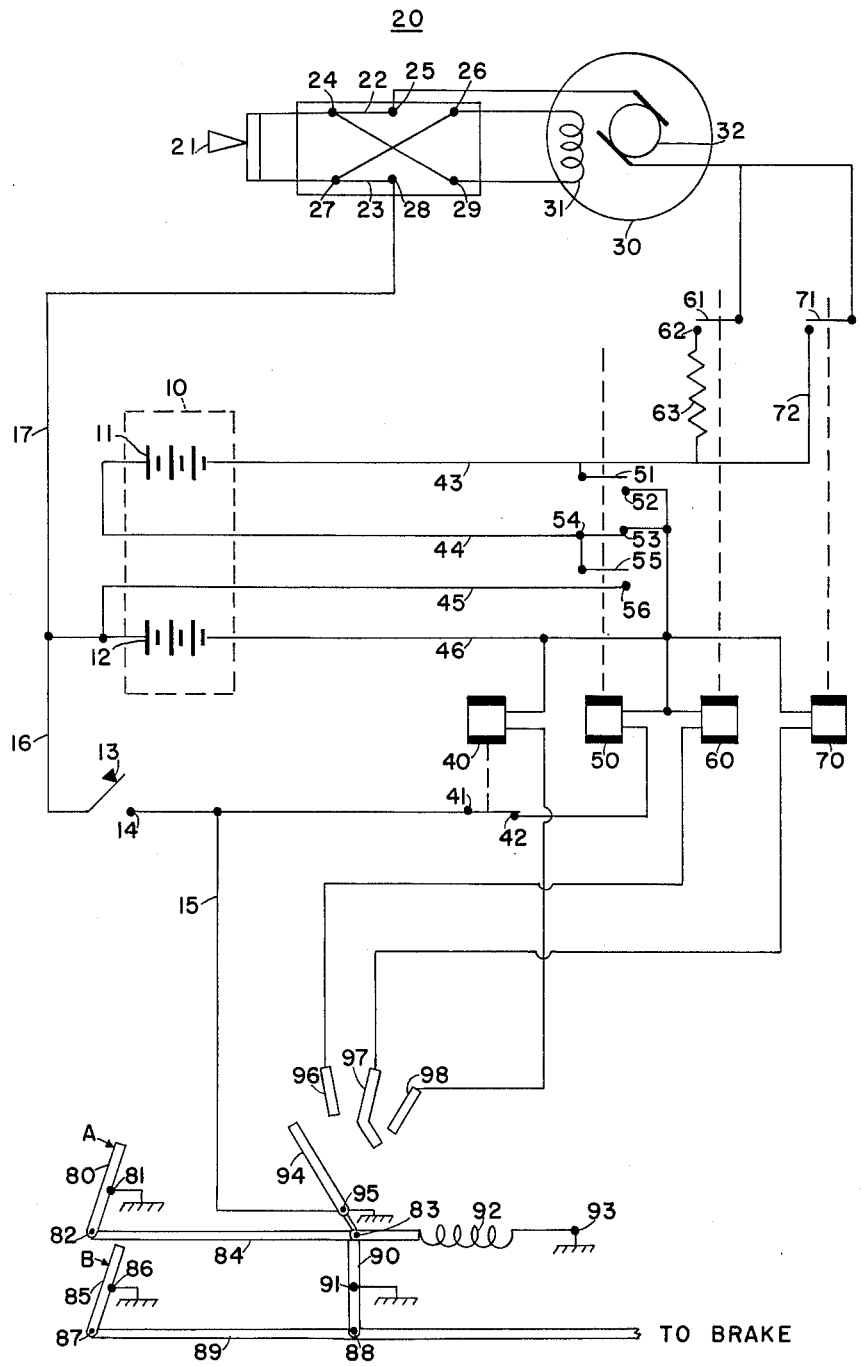

3,241,019
CONTROL SYSTEM FOR BATTERY DRIVEN VEHICLE HAVING ACCELERATOR-BRAKE INTERLOCK
Arthur R. Gross, 816 Hilltop Road, St. Paul 18, Minn.
Filed Nov. 5, 1962, Ser. No. 235,321
6 Claims. (Cl. 318—139)

This invention pertains to control apparatus for automotive vehicles, and more particularly, to control apparatus for controlling the speed and operation of an electrically powered golf car.

Electrically powered golf cars are presently in widespread use, and are usually controlled by means of a foot-operated variable resistance which is connected in series with a bank of automotive type batteries and the electric motor. When such a system is used, the initial movement of an accelerator pedal completes a circuit including the motor and batteries, together with the entire resistance of the variable resistor. Then, as the accelerator is increasingly depressed, the portion of the variable resistance which remains in this series circuit is reduced proportionally until the accelerator pedal is fully depressed, at which point the series circuit includes only the motor and the bank of batteries. Such a control system is generally unsatisfactory, since the accelerator pedal must be quickly depressed as far as possible if substantial loss of energy in the resistance is to be avoided, but on the other hand, when the accelerator pedal is suddenly depressed to its limit of travel, the entire voltage of the bank of batteries is suddenly placed across the electric motor thereby causing a sudden and uncomfortable initial movement of the controlled vehicle. Thus, in operation, it is customary for the operator to avoid a "jerky" start by gradually depressing the accelerator, and since the operator is normally not conscious of the necessity for depressing the accelerator to its limit of travel, a portion of the variable resistance remains in the series circuit for extended periods of time. This results in reduced overall efficiency due to the loss of energy in the resistor, necessitating earlier recharging than should be necessary, and has been found to be generally unsatisfactory.

These problems are avoided in my control system by providing a relatively simple control system which permits a gradual start, and which provides intermediate and high-speed operation without a resistance in the motor circuit. Thus, a loss of energy through the resistance is substantially eliminated, while providing comfortable and convenient control of the vehicle.

Thus, it is an objective of my invention, to provide a control system for an electrically powered automotive vehicle which permits gradual movement of the vehicle from an initial starting movement to maximum speed, and including an intermediate speed operation, with very little loss of power through a resistance device.

This and other objects of my invention will become apparent from an examination of the following description, when considered in conjunction with the attached single sheet of drawings showing a schematic diagram of my control apparatus.

My control apparatus includes a bank of batteries 10 connected into the circuit in two sections 11 and 12, as shown. Conventional six volt automotive batteries are preferred for this application, with a total of six such batteries being used. In my preferred system, three of the six batteries are connected in series to form battery 11, and the other three batteries are connected in series to form battery 12, thus providing two separate 18-volt sources of energy. Although I have found it desirable to use a total of 36 volts, with 18 volts in each of the illustrated batteries 11 and 12, it may be desirable in some applications to use a different number of batteries, divided in varying proportions.

A reversing switch 20 is provided, and is connected in series with D.C. motor 30, to permit reversal of the motor and reverse movement of the controlled vehicle. Handle 21 is shown in a position to connect terminals 24 and 25 through switch arm 22, and to connect terminals 27 and 28 through switch arm 23. When the switch is operated by moving handle 21 to the right position, switch arm 22 connects terminals 25 and 26, and switch arm 23 connects terminals 28 and 29, and it is apparent that this switch is therefore connected to cause a reversal of the current flow through motor coil 31 when the switch is moved from one position to the other. My description of this control system will be based on the illustrated position of the switch, which is presumed to provide forward movement of the vehicle.

When it is desired to operate the vehicle, the operator must first close switch 13, 14 which is preferably in the form of a key operated switch. When switch 13, 14 is closed, a circuit is completed from battery 12 through lead 16 to switch 13, 14 and relay contacts 41, 42 to relay 50, and thence to the negative side of battery 12 through lead 46. Relay 50 then operates, opening contacts 53, 54 and closing contacts 51, 52 and 55, 56.

With relay 50 operated, my control circuit is conditioned to control the forward movement of the vehicle upon movement of accelerator pedal 80. The operator depresses accelerator pedal 80 at point A as indicated, thereby rocking the pedal in a clockwise direction about pivot 81, this pivot point being in a fixed position with respect to the vehicle. The lower end of accelerator pedal 80 is then moved to the left, causing control rod 84 to move in a leftward direction against the force of spring 92 which is securely attached to the frame of the vehicle at point 93. Control rod 84 is pivotally connected to accelerator 80 at point 82, and is pivotally connected to control rod 90 and wiper arm 94 at pivot point 83. As control rod 84 moves to the left, wiper arm 94 rotates in a clockwise direction about pivot point 95, until wiper arm 94 engages contact 96. A circuit is then completed from battery 12, through lead 16, by way of switch 13, 14, lead 15, through wiper arm 94 contact 96, and thence through relay 60 to the other side of battery 12 by way of lead 46. It should be noted that although lead 15 is schematically shown connected to wiper arm 94 at point 95, pivot point 95 is mechanically located and attached to the frame of the vehicle, whereas the electrical circuit is insulated therefrom by any suitable means (not shown). Similarly, wiper arm 94 is actually insulated from pivot point 83, as well as the other mechanical portions of the linkage.

Relay 60 operates in said circuit, thereby closing contacts 61, 62 and a circuit is then completed from battery 12, over lead 17 to switch 20 through coil 31 and armature 32 of motor 30, contacts 61, 62 of relay 60, resistor 63, and contacts 51, 52 of relay 50 and thence through lead 46, to the other side of battery 12. A parallel circuit is also completed from battery 11 through lead 44, contacts 55, 56 of relay 50, leads 45 and 17, switch 20 and motor 30, and through contacts 61, 62 of relay 60 to resistor 63, and thence over lead 43 to the other side of battery 11. Thus, the batteries 11 and 12 are connected in parallel so as to provide an 18-volt source of supply, said source being effectively connected in series with motor 30 and resistor 63.

It will be noted that with relay 60 operated as described, and with resistor 63 thereby connected in series with motor 30, only a portion of the 18-volt supply is used to energize motor 30, and I have found that this effectively eliminates any sudden or jerky starting of the controlled vehicle.

As the operator further depresses accelerator pedal 80, wiper arm 94 moves from contact 96 to contact 97, these contacts being located in close proximity to one another so that wiper arm 94 is still in contact with wiper arm 96 when it initially engages wiper arm 97. A circuit is then completed from battery 12, through lead 16, switch contacts 13, 14, lead 15, wiper arm 94, contact 97, relay 70, and thence back on lead 46 to battery 12. Relay 70 then operates, closing contacts 71, 72, thereby shorting out resistor 63, and causing the entire 18-volt supply to be placed across motor 30. When wiper arm 94 actually moves out of engagement with contact 96, the circuit to relay 60 is then broken and contacts 61, 62 are opened. However, since a circuit is then closed through contact 71, 72, motor 30 continues to operate.

Thus, it is apparent that I have now described a circuit for permitting a smooth start of the controlled vehicle, and an intermediate speed position which permits the motor to be connected directly across the parallel combination of batteries 11 and 12, without any loss of energy in resistor 63. If the operator desires to move the vehicle at maximum speed, he continues to depress accelerator 80 until wiper arm 94 is in engagement with contact 98, thereby completing a circuit from battery 12 through lead 16, switch contacts 13, 14, lead 15, wiper 94, contact 98, relay 40, and thence back on lead 46 to battery 12.

Relay 40 then operates, opening contacts 41, 42, which opens the circuit to relay 50 causing contacts 51, 52 and 55, 56 to open and contacts 53, 54 to close. Relay 70 continues to be operated in view of the L-shaped extension on contact 97, and a circuit is then completed from battery 10, over lead 44 to contacts 53, 54 of relay 50, to the opposite pole of battery 12 by way of lead 46, over lead 17 to reversing switch 20 and motor 30, and thence through contacts 71, 72 of relay 70 and back to battery 11 by way of lead 43. Thus, a series circuit has been created, wherein batteries 11 and 12 are connected so as to provide 36 volts for operating motor 30. The vehicle is then caused to move at maximum speed, with the full available voltage of batteries 11 and 12 connected across the motor. It is apparent that my control apparatus permits the driver to select a desirable speed of travel without losing an excessive amount of energy through heat dissipation in resistor 63, thus permitting a greater distance to be traveled for each charge of the batteries.

It will be noted that the sequence of operation of the contacts of relay 50 must be carefully controlled. The relay that I have used for this application is designed to insure that contacts 53, 54 open before the other contacts close when relay 50 is initially energized, and when relay 50 is de-energized, contacts 51, 52 and 55, 56 open before contacts 53, 54 close. This sequence of operation is essential if a direct short across batteries 11 and 12 is to be avoided.

When the operator desires to stop the vehicle, he depresses brake pedal 85 at point B as indicated, thereby rocking pedal 85 about pivot point 86 in a clockwise direction. Control rod 89, which extends to a braking mechanism (not shown) is then moved to the left, being pivotally connected at point 87 to the brake pedal, and at point 88 to control arm 90. When this occurs, control rod 90 is rotated in a clockwise direction about pivot point 91, thereby driving control rod 84 to the right and insuring that wiper arm 94 is moved out of engagement with contacts 96, 97 and 98, thereby aiding the operation of spring 92, and also insuring that the motor is de-energized in the event that spring 92 is broken. Thus, this linkage prevents the operator from attempting to accelerate the vehicle and use the brake at the same time, since only one of these operations can be performed at one time.

What has been described is considered to be the preferred embodiment of my invention, but it will be obvious to those skilled in the art that various changes and modifications may be made therein without departing from the spirit of the invention. Thus, it is intended in the appended claims to cover all such modifications as fall within the true spirit and scope of the invention.

What is claimed is:

1. Control apparatus for a battery-driven automotive vehicle, comprising: an accelerator; battery means; an electric motor effective when energized to propel said vehicle; a single control switch directly operated by said accelerator through successive steps corresponding to the extent of accelerator movement; circuit means including said steps for causing said battery means to energize said motor to successively increased speeds corresponding to said extent of movement; brake means effective when operated to provide a braking action for said vehicle; and solely mechanical means inter-connecting said accelerator and brake means effective upon operation of said brake means to actuate said control switch to a non-operated condition and thereby de-energize said motor.

2. Control apparatus for a battery-driven automotive vehicle, as claimed in claim 1, wherein said circuit means includes motor reversing means and a plurality of relays interconnected with said control switch and effective when sequentially energized to change the speed of said vehicle, the direction of movement thereof being determined by the condition of said reversing means.

3. Control apparatus for a battery-driven automotive vehicle as claimed in claim 2, wherein said control switch consists of a wiper arm connected to said accelerator means and a plurality of fixed contact members arranged to be successively contacted by said wiper arm as said accelerator means is increasingly depressed by said operator; and wherein said circuit means additionally includes: a resistor; a first control circuit including said wiper arm, a first one of said contacts, and a first one of said relays, operation of said first relay therein being effective to cause the completion of an energizing circuit including said resistor, said battery means, and said motor; a second control circuit including said wiper arm, a second one of said contacts, and a second one of said relays, operation of said second relay therein being effective to cause completion of a second energizing circuit including said battery means and said motor, independently of said resistor and said first relay; and a third control circuit including said wiper arm, a third one of said contacts, and a third one of said relays; operation of said third relay therein being effective to condition said battery means to supply a second level of voltage to said motor.

4. Control apparatus for a battery-driven automotive vehicle, comprising: an accelerator; a single control switch directly operated by said accelerator through successive steps as said accelerator means is increasingly depressed by the operator of said vehicle; a plurality of relays; a battery means; a resistor; a reversing switch; a motor effective when energized to propel said vehicle in either a forward or reverse direction determined by the condition of said reversing switch; a first control circuit including said control switch, a first one of said relays, and said battery means, for operating said first relay to thereby cause said battery means to energize said motor through said resistor and operate said vehicle at a first speed; a second control circuit including said control switch, a second one of said relays and said battery means, for operating said second relay to thereby cause said battery means to energize said motor independently of said first relay and said resistor and thereby cause said vehicle to be operated at a second speed; and a third control circuit including said control switch, a third one of said relays, and said battery means, for operating said third relay to thereby condition said battery means to supply a second level of voltage to said motor and operate said vehicle at a third speed.

5. Control apparatus for a battery-driven automotive vehicle as claimed in claim 4, additionally comprising: brake means effective when manually operated to provide a braking action for said vehicle; and solely mechanical means interconnecting said accelerator and brake means effective upon operation of said brake means to force said wiper arm to a non-operated condition and thereby open said control circuits and cause said motor to be de-energized.

6. Control apparatus for a battery-driven automotive vehicle, comprising: an accelerator; a wiper arm connected to said accelerator; a plurality of fixed contact members arranged to be successively contacted by said wiper arm as said accelerator is increasingly depressed by the operator of said vehicle; a reversing switch; a motor effective when energized to propel said vehicle in either a forward or reverse direction determined by the condition of said reversing switch; a pair of batteries; a plurality of relays; a control switch; first control circuit means including one of said batteries, said control switch, and a first one of said relays, said first relay being operated responsive to actuation of said control switch to thereby connect said batteries in parallel to supply a first level of voltage a resistor; a second control circuit including said one battery, said wiper arm, a first one of said contact members, and a second one of said relays, said second relay being operated responsive to contact between said wiper arm and said first contact to thereby complete a first series energizing circuit including said parallel connected batteries, said resistor, and said motor, thereby causing said vehicle to be propelled at a first speed; a third control circuit including said one battery, said wiper arm, a second one of said contact members, and a third one of said relays, said third relay being operated responsive to contact between said wiper arm and said second contact member to thereby complete a second energizing circuit including said parallel connected batteries and said motor, independently of said second relay and said resistor, to thereby cause said vehicle to be propelled at a second speed; and a fourth control circuit including said one battery, said wiper arm, a third one of said contact members, and a fourth one of said relays, said fourth relay being operated responsive to contact between said wiper arm and said third contact member to thereby open said first control circuit and de-energize said first relay, whereupon said batteries are connected in series with each other and with said motor in said second energizing circuit to thereby cause said vehicle to be propelled at a third speed.

References Cited by the Examiner
UNITED STATES PATENTS 1,110,821 9/1914 Radley _____ 318—139
3,117,648 1/1964 Landreth _____ 318—139 X ORIS L. RADER, *Primary Examiner.*
JOHN F. COUCH, *Examiner.*